United States Patent [19]

Fujita et al.

[11] Patent Number: 5,624,351
[45] Date of Patent: Apr. 29, 1997

[54] SPEED CHANGE CONTROL METHOD FOR AN AUTOMATIC TRANSMISSION

[75] Inventors: Kenjiro Fujita; Katsuhiro Hatta; Katsutoshi Usuki, all of Tokyo, Japan

[73] Assignee: Mitsubishi Jidosha Kogyo Kabushiki Kaisha, Tokyo, Japan

[21] Appl. No.: 454,178

[22] PCT Filed: Oct. 24, 1994

[86] PCT No.: PCT/JP94/01781

§ 371 Date: Jun. 22, 1995

§ 102(e) Date: Jun. 22, 1995

[87] PCT Pub. No.: WO95/12078

PCT Pub. Date: May 4, 1995

[30] Foreign Application Priority Data

Oct. 25, 1993 [JP] Japan ............................. 5-266527

[51] Int. Cl.$^6$ .......................................... F16H 61/02
[52] U.S. Cl. ................................... 477/148; 477/133
[58] Field of Search ........................... 477/144, 148, 477/132, 133, 135, 136, 139, 140, 141

[56] References Cited

U.S. PATENT DOCUMENTS

| | | | |
|---|---|---|---|
| 4,576,065 | 3/1986 | Speranra et al. | 477/148 |
| 5,038,636 | 8/1991 | Vukovich et al. | 477/144 |
| 5,319,998 | 6/1994 | Iwatsuki et al. | 477/144 |
| 5,345,843 | 9/1994 | Fujita et al. | 477/98 |
| 5,370,016 | 12/1994 | Fujita et al. | |
| 5,435,796 | 7/1995 | Fujita et al. | 477/154 |
| 5,443,432 | 8/1995 | Fujita et al. | 477/155 |
| 5,445,577 | 8/1995 | Fujita et al. | 477/120 |
| 5,445,579 | 8/1995 | Fujita et al. | 477/156 |

FOREIGN PATENT DOCUMENTS

| | | |
|---|---|---|
| 60-34562 | 2/1985 | Japan . |
| 2-67156 | 5/1990 | Japan . |
| 2-146364 | 6/1990 | Japan . |

*Primary Examiner*—Charles A. Marmor
*Assistant Examiner*—Sherry Lynn Estremsky

[57] ABSTRACT

A speed change control method for an automatic transmission, which can achieve a smooth skip downshifting even when a driver depresses an accelerator pedal slowly in kickdown. An electronic control unit 6 calculates, at the time when a predetermined time period elapses from the time when a downshifting command from a fourth speed to a third speed is outputted, a difference between the throttle valve opening degree $\theta_{t1}$ at that time and the throttle valve opening degree $\theta_{ts}$ at the time when the downshifting command is outputted, and a change rate $(\downarrow_{t1})'$ of the throttle valve opening degree at the time when the predetermined time period elapses. If the calculated difference is larger than the threshold value $\Delta\theta$ and the calculated change rate is higher than the threshold value $\Delta(\theta)'$ (S10, S11), the electronic control unit 6 outputs a command for canceling the command for downshifting from the fourth speed to the third speed, which has already been outputted (S12), and outputs a command for downshifting from the fourth speed to a second speed (S13).

10 Claims, 4 Drawing Sheets

SPEED CHANGE CONTROL METHOD FOR AN AUTOMATIC TRANSMISSION

TECHNICAL FIELD

The present invention relates to a speed change control method for an automatic transmission, and more particularly, to a speed change control method for an automotive automatic transmission, in which shift feeling in kickdown is improved.

BACKGROUND ART

An automotive automatic transmission generally has planetary gears including power transmitting elements such as sun gears and planetary carriers, and a speed change mechanism including hydraulic friction-engaging elements such as hydraulic wet-type multiple disc clutches and hydraulic band brakes. In the automotive automatic transmission, a line pressure created by a hydraulic pump driven by a crankshaft of an engine is used as a drive source for hydraulic friction-engaging elements. The automatic transmission of this type controls the operating conditions of the engaging elements by controlling the oil pressure supply to respective engaging elements, by which the engine torque transmission path on the planetary gear is changed to obtain a desired speed (gear ratio).

An electronic control type automatic transmission uses an electromagnetic oil pressure control valves (hereinafter called solenoid valves) to control the operating conditions of the hydraulic friction-engaging elements. By controlling the on/off or the on/off duty ratio of a solenoid valve, the oil pressure supply to a hydraulic friction-engaging element is allowed or inhibited, or the oil pressure supplied to the friction-engaging element is increased or decreased, by which the friction-engaging element is engaged or disengaged. The hydraulic friction-engaging element to be engaged is changed, that is to say, one of the hydraulic friction-engaging elements relating to speed change is engaged while the other of the hydraulic friction-engaging elements is disengaged, so that a speed change is carried out while the speed change shock in engagement and disengagement of the friction-engaging elements is reduced.

For example, when downshifting is carried out from the fourth speed to the third speed, the hydraulic clutch for establishing the fourth speed (hereinafter called the disengagement-side clutch) is disengaged, and the hydraulic clutch for establishing the third speed (hereinafter called the engagement-side clutch) is engaged simultaneously. By switching the operation of the hydraulic clutches, the engine torque transmission path is changed, so that the downshifting operation is completed.

In the above-described electronic control type automatic transmission, a shift map as shown in FIG. 5, in which the vehicle speed and the throttle valve opening degree are used as parameters, is generally used to select a gear position. From this map, an optimum gear position (target gear position) for the detected value of the vehicle speed and the detected value of the throttle valve opening degree is selected. In the case of kickdown to obtain a quick acceleration, the target gear position is usually determined by the throttle valve opening degree. Specifically, when the throttle valve opening degree crosses a 4–3 shift line or a 3–2 shift line in FIG. 5, a downshifting command is outputted. For example, when the throttle valve opening degree reaches point B from point A in FIG. 5 by the driver's depression of an accelerator pedal, a command for downshifting from the fourth speed to the third speed is outputted.

When the throttle valve opening degree reaches point C from point A, a command for a skip downshifting from the fourth speed to the second speed is outputted.

If the driver depresses the accelerator pedal slowly in spite of the fact that the driver has an intention of finally depressing the accelerator pedal to the second speed zone from the fourth speed zone, the shift of the throttle valve opening degree from point A to point C is implemented slowly. In this case, when the throttle valve opening degree crosses the 4–3 shift line (point B), a command for downshifting from the fourth speed to the third speed is outputted. When the throttle valve opening degree crosses the 3–2 shift line, the downshifting from the fourth speed to the third speed may have already been started. In such a case, since the disengagement or engagement of the clutch relating to the downshifting to the third speed is being executed, it is impossible to carry out the skip downshifting to the second speed. Therefore, the downshifting to the second speed must be carried out after the downshifting to the third speed has been completed. As a result, two shift shocks are caused by two downshifting operations, and it takes much time to establish the second speed, thereby degrading the shift response.

DISCLOSURE OF THE INVENTION

An object of the present invention is to provide a speed change control method for an automatic transmission, which can achieve a smooth skip downshifting even when a driver depresses an accelerator pedal slowly in a kickdown.

To achieve the above object, the present invention provides a speed change control method for an automatic transmission arranged to establish a plurality of speeds, comprising the steps of: determining an elapsed time from the time when a command for speed change from a first speed to a second speed, which is lower than the first speed, is detected; determining the presence/absence of a request for speed change to a third speed, which is lower than the second speed, if it is judged that a predetermined time period has elapsed from the time when a command for speed change to the second speed is detected; and commanding speed change to the third speed instead of speed change to the second speed if it is judged that the request for speed change to the third speed is present.

As described above, according to the present invention, if the request for speed change to the third speed is made at the time when the predetermined time period has elapsed from the time when the command for speed change from the first speed to the second speed is detected, a speed change to the third speed is commanded instead of the speed change to the second speed. Therefore, even when a driver depresses the accelerator pedal slowly, the skip downshifting from the first speed to the third speed is carried out smoothly, so that the incidence of shift shocks is reduced by half, and the time period required for shifting is shortened, by which the response is increased.

Preferably, the first speed is canceled and the second speed is established in response to the command for speed change from the first speed to the second speed, and when the speed change to the third speed is commanded, the first speed is re-established, and then the third speed is established. According to this preferred embodiment, the first speed is re-established in response to the command for speed change to the third speed. Therefore, the skip downshifting from the first speed to the third speed can be carried out quickly and smoothly.

Preferably, the predetermined time period is set at a value shorter than the time period required for actually starting the cancellation of the first speed in response to the command for speed change to the second speed. According to this preferred embodiment, the presence/absence of a request for speed change to the third speed can be judged before the cancellation of the first speed is actually started, so that the timing of judgment of the presence/absence of the request for speed change to the third speed can be rationalized.

Preferably, a difference between an engine load at the time when the command for speed change to the second speed is detected and an engine load at the time when the predetermined time period has elapsed from the time when the command for speed change to the second speed is detected, or an engine load change rate at the time when the predetermined time period has elapsed from the time when the command for speed change to the second speed is detected, is detected, and it is judged that the request for speed change to the third speed is present if the difference between the detected engine loads or the engine load change rate is greater than a predetermined value. According to these preferred embodiments, the request for speed change to the third speed can be judged properly.

BEST MODE FOR CARRYING OUT THE INVENTION

A speed change control method for an automotive automatic transmission in accordance with one embodiment of the present invention will be described in detail with reference to the drawings.

Figure 1:
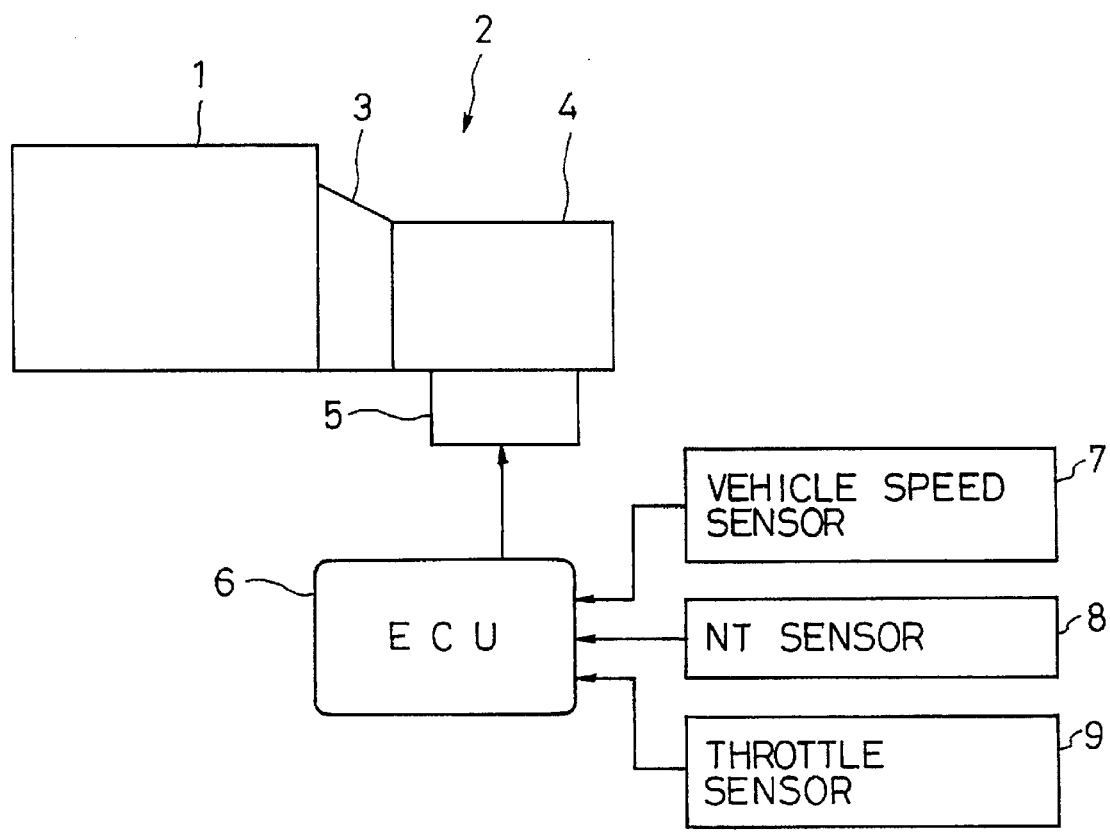
FIG. 1 is a schematic view of an automotive power plant to which a speed change control method in accordance with one embodiment of the present invention is applied.

Referring now to FIG. 1, an automatic transmission 2 comprising a torque converter 3, a transmission 4, and an oil pressure controller 5 is drivingly connected to a crankshaft (not shown) of an engine 1, so that the output of the engine 1 is transmitted to driving wheels (not shown) of an automobile via the automatic transmission 2. The transmission 4 incorporates a plurality of sets, for example, two sets of planetary gears, and hydraulic friction-engaging elements such as a hydraulic clutch and a hydraulic brake. An oil pressure controller 5 is formed with a hydraulic circuit, not shown. This hydraulic circuit is supplied with pressurized hydraulic fluid generated by a hydraulic pump (not shown) which is driven by the crankshaft of the engine 1. At various parts of the hydraulic circuit, various control valves (not shown) including a plurality of solenoid valves which are subject to duty control carried out by an ECU 6. The various control valves are operated under the control of the ECU 6 to control the oil pressure supply to the hydraulic friction-engaging elements of the transmission 4, by which any one of a plurality of speeds, for example, the first to fourth and reverse gears, of the transmission 4 is established.

The ECU 6 includes input/output devices, memories (nonvolatile RAM, ROM, etc.), a central processing unit (CPU), a counter used as a timer, and the like (none of which are illustrated). A vehicle speed sensor 7 for detecting the vehicle running speed V, an $N_T$ sensor 8 for detecting the rotational speed $N_T$ of the turbine of the torque converter 3, and a throttle sensor (engine load detecting means) 9 for outputting a voltage $V_{TH}$ representing the throttle valve opening θ are connected to the input side of the ECU 6. The ECU 6, in corporation with the sensors 7 to 9, composes a speed change control apparatus for carrying out the speed change control method of this embodiment. In addition to the sensors 7 to 9, various sensors and switches such as an inhibitor switch for detecting the gear position and an $N_E$ sensor for detecting the engine rotational speed $N_E$ are connected to the ECU 6. However, these elements are not illustrated in FIG. 1 because they are not directly related to the speed change control method of this embodiment.

Figure 2:
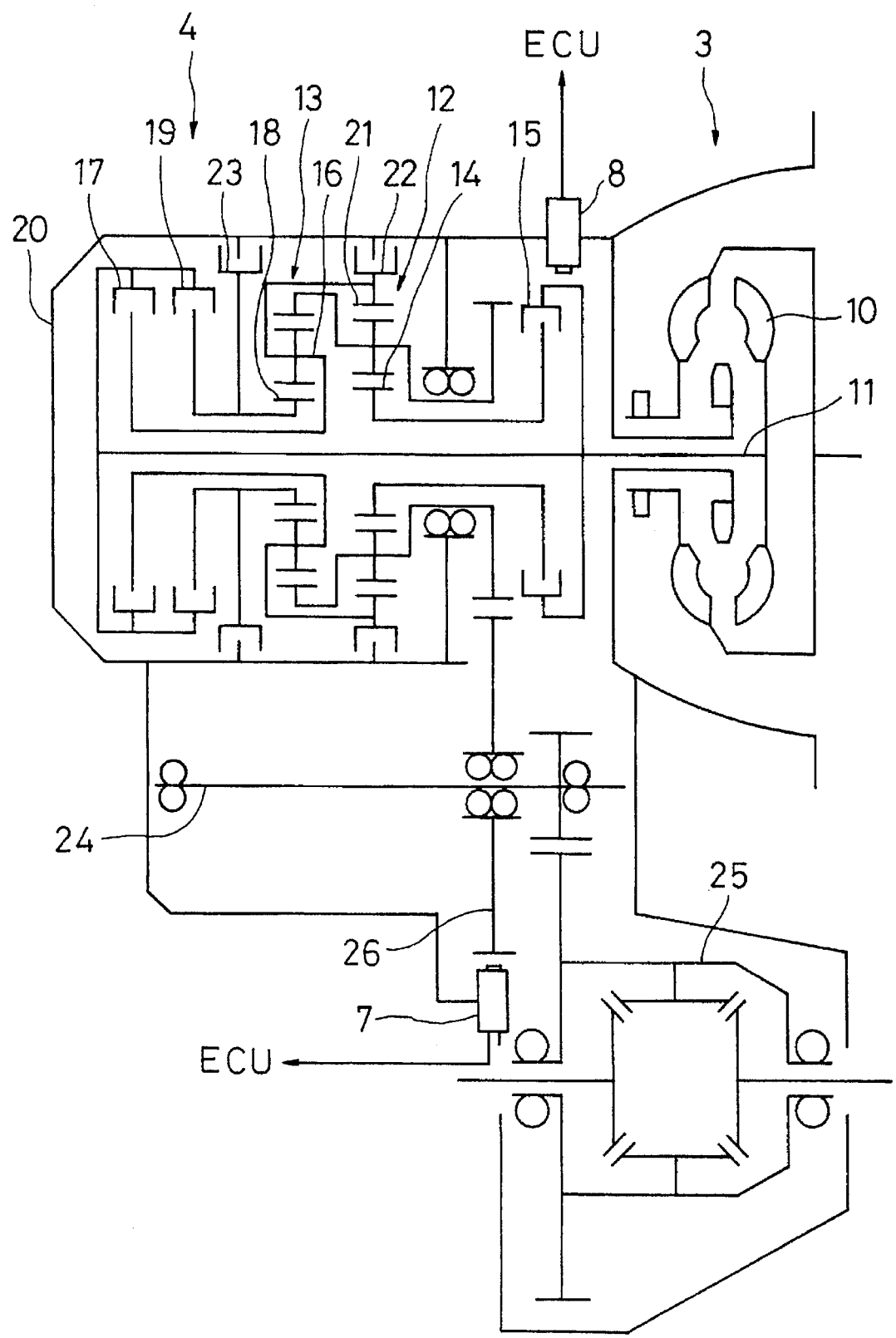
FIG. 2 is a skeleton view showing a gear train of the transmission shown in FIG. 1.

Referring to FIG. 2, the transmission 4 has a first planetary gear 12, a second planetary gear 13, and an input shaft 11 connected to a turbine 10 of a torque converter 3 for rotation in unison therewith. To the input shaft 11 are drivingly connected the respective input sides of a first clutch 15, a second clutch 17, and a third clutch 19. When hydraulic fluid is supplied to an engagement piston (not shown) of each of the clutches 15, 17, and 19, the input and output sides of the clutch are engaged with each other, and when the hydraulic fluid is discharged from the piston of the clutch, the input and output sides thereof are disengaged from each other. The respective output sides of the first, second, and third clutches 15, 17, and 19 are connected to a sun gear 14 of the first planetary gear 12, a pinion carrier 16 of the second planetary gear 13, and a sun gear 18 of the second planetary gear 13, respectively.

Accordingly, when the first clutch 15 is engaged, the sun gear 14 is drivingly connected to the input shaft 11. When the second clutch 17 is engaged, the pinion carrier 16 is connected to the input shaft 11. When the third clutch 19 is engaged, the sun gear 18 is connected to the input shaft 11.

A first brake 22 and a second brake 23 each including an engagement servo device (not shown) are installed to a casing 20 of the transmission 4. When hydraulic fluid is supplied to the servo device of the first brake 22, the first brake 22 is engaged and operates to fix an internal gear 21 of the first planetary gear 12 so that the internal gear 21 cannot rotate. When the hydraulic fluid is discharged from the servo device of the first brake 22, the internal gear 21 is allowed to rotate. Similarly, when hydraulic fluid is supplied to the servo device of the second brake 23, the sun gear 18 of the second planetary gear 13 is fixed, and when the hydraulic fluid is discharged, the sun gear 18 is allowed to rotate. The rotation of the input shaft 11 is transmitted to a counter shaft 24 via the planetary gears 12 and 13, and further transmitted from the counter shaft 24 to a differential carrier 25.

In this embodiment, both the vehicle speed sensor 7 and the $N_T$ sensor 8 are proximity switches, which are installed to the casing 20 of the transmission 4. The vehicle speed sensor 7 determines a vehicle speed V by detecting the rotational speed of a driven gear 26 fixed to the counter shaft 24. The $N_T$ sensor 8 detects the turbine rotational speed $N_T$ via the first clutch 15 and the input shaft 11.

In the automatic transmission 2 of this embodiment, the engagement of the first to third clutches 15, 17, and 19 and the first and second brakes 22 and 23, which are the friction-engaging elements, is controlled to establish any one of the first to fourth and reverse gears as shown in Table 1. In Table 1, the O mark indicates the engagement of the clutch or the brake.

TABLE 1

| Speed | Friction-engaging element | | | | |
|---|---|---|---|---|---|
| | 1st Clutch 15 | 2nd Clutch 17 | 2nd Brake 23 | 1st Brake 22 | 3rd Brake 19 |
| 1st | O | | | O | |
| 2nd | O | | O | | |
| 3rd | O | O | | | |
| 4th | | O | O | | |
| RVS | | | | O | O |
| N, P | | | | | |

As seen from Table 1, the fourth gear or fourth speed can be established by engaging the second clutch 17 and the second brake 23, and the third speed can be established by engaging the first clutch 15 and the second clutch 17. The second speed can be established by engaging the first clutch 15 and the second brake 23. Therefore, the downshifting from the fourth speed to the third speed can be carried out by disengaging the second brake 23 and engaging the first clutch 15, and the downshifting from the third speed to the second speed can be carried out by disengaging the second clutch 17 and engaging the second brake 23. The skip downshifting from the fourth speed to the second speed can be carried out by disengaging the second clutch 17 and engaging the first clutch 15.

The speed change control procedure executed by the ECU 6 in downshifting from the fourth speed to the third speed and from the fourth speed to the second speed will be described with reference to FIGS. 3 and 4.

Figure 4:
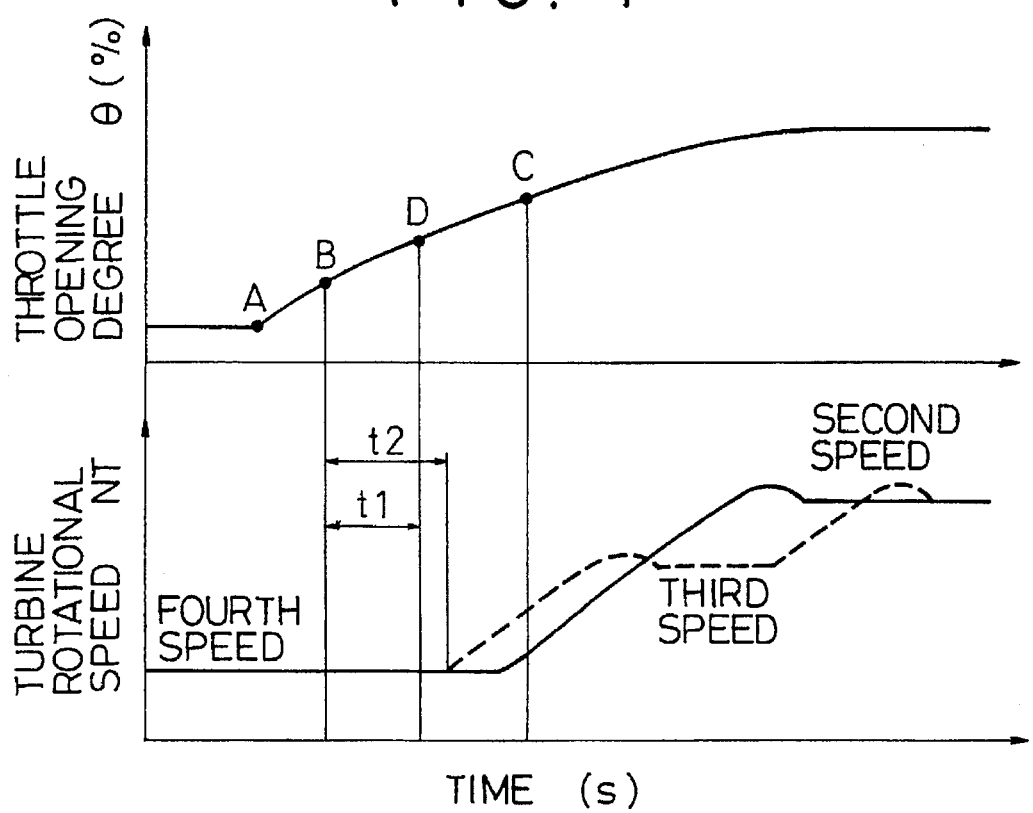
FIG. 4 is a graph exemplarily showing the change in the throttle valve opening and the turbine rotational speed with elapse of time during speed change.

A graph in FIG. 4 shows the relationship between the throttle valve opening degree $\theta$ and the turbine rotational speed $N_T$ with the elapsed time being represented by the abscissa.

Figure 5:
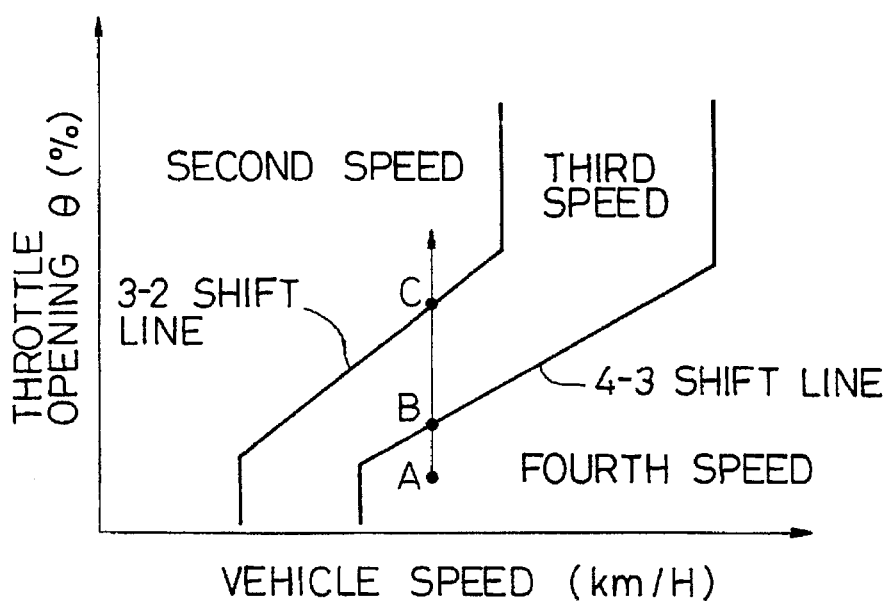
FIG. 5 is a view exemplarily showing a shift map in which the vehicle speed and the throttle valve opening are used as parameters.

In carrying out the speed change control, the ECU 6 periodically determines whether the throttle valve opening degree $\theta$ has crossed the 4–3 shift line on the basis of the output of the throttle sensor 9 and the shift map as shown in FIG. 5 in a gear position judgment routine, not shown.

When the accelerator pedal is depressed by a driver (after time point A in FIG. 4), the throttle valve opening degree $\theta$ increases. If it is judged that the throttle valve opening degree $\theta$ has crossed the 4–3 shift line (point B in FIG. 4) in the gear position judgment routine, the ECU 6 starts the speed change control processing shown in FIG. 3. This processing is repeatedly executed at predetermined control intervals (for example, 10 ms) during the speed change control.

In this speed change control, the ECU 6 first determines whether the control program control variable $I_{ZR}$ is "1" in Step S1. The control variable $I_{ZR}$ has been set at the initial value "0" in the initialization processing, which is carried out at the start of the engine 1, for example, or in Step S14 (described later) of the previous speed change control processing. Therefore, the judgment result in Step S1 immediately after the start of the speed change control is No, and the control processing proceeds to Step S2.

In Step S2, the ECU 6 outputs a command for downshifting from the fourth speed to the third speed. In response to this downshifting command, the supply control of hydraulic fluid to the first clutch 15 and the discharge control of hydraulic fluid from the second brake 23 are started by the oil pressure controller 5. This supply/discharge control of the hydraulic fluid is known; therefore, the explanation is omitted.

Next, the ECU 6 sets the value of the control variable $I_{ZR}$ to "1" (Step S3), starts the countdown operation of a timer serving as time counting means (Step S4), reads the output of the throttle sensor 9 as a throttle valve opening degree $\theta_{ts}$ at the time point when the 4–3 downshifting command is outputted (point B in FIG. 4), and stores this value in the memory (Step S5).

The timer value t at the start of the timer countdown is equal to the initial value t1 (in this embodiment, 0.1 second) set in the initialization processing or in Step S15 (described later) of the previous speed change control processing. This initial value t1 is set so as to be shorter than the time period (speed change initiation time period t2) normally required from the output of the 4–3 downshifting command to the actual start of speed change from the fourth speed to the third speed in the transmission 4, that is, the time period normally required from the output of the 4–3 downshifting command to the initiation of slipping of the second brake 23. Therefore, even if the discharge of hydraulic fluid is started immediately in response to the 4–3 downshifting command, the second brake 23 begins to slip normally after elapse of the speed change initiation time period t2. When the countdown start processing in Step S5 is completed, the control processing of this cycle is finished.

After the predetermined control interval has elapsed, the next control cycle is started. Since the control variable $I_{ZR}$ has been set to "1" in Step S3 of the previous control cycle, the judgment result in Step S1 is Yes, so that the control processing proceeds to Step S6. In Step 6, the ECU 6 determines whether the speed change from the fourth speed to the third speed has actually started on the basis of, for example, the degree of increase in the turbine rotational speed $N_T$. The reason for performing this determination is due to the fact that the actual speed change may start before the speed change initiation time period t2 elapses from the time when the downshifting command is outputted.

Immediately after the 4–3 downshifting command is outputted, the turbine rotational speed $N_T$ does not increase so much from the turbine rotational speed $N_T$ at the time when the downshifting command is outputted. Therefore, it is judged that actual speed change has not started. If the judgment result in Step S6 is No in this manner, the ECU 6 determines whether the timer value t is equal to "0", that is whether the timer countdown has been completed in Step S7. Immediately after the 4–3 downshifting command is outputted, this judgment result is No. Therefore, the ECU 6 reads the output of the throttle sensor 9 representing the throttle valve opening degree $\theta$, and stores the value in the memory (Step S8), completing the control processing of this cycle.

The above-described Steps S1 and S6 through S8 are executed repeatedly, and by the execution of Step S8, the data of the throttle valve opening degree $\theta$ which has been stored in the memory is updated. If it is judged that t is equal to 0 in Step S7 before it is judged that the 4–3 speed change has actually started (point D in FIG. 4), the control processing proceeds to Step S9.

In Step S9, the ECU 6 reads the output of the throttle sensor 9, and stores the value in the memory as the throttle valve opening degree $\theta_{t1}$ (point D in FIG. 4) at the time when the time period t1 has elapsed from the output of the 4–3 downshifting command. Next, the ECU 6 reads the throttle valve opening degree $\theta_{t1}$ and the throttle valve opening degree $\theta_{ts}$, which has been stored in the memory at the time when the downshifting command is outputted (point B in FIG. 4), calculates the difference between the throttle valve opening degrees $\theta_{t1}$ and $\theta_{ts}$, which represents the difference between the engine load at the time when the 4–3 downshifting command is outputted and the engine load at the time when the time period t1 has elapsed, and determines whether this difference is larger than a threshold value $\Delta\theta$ read from the memory (Step S10). As described above, the throttle valve opening degree $\theta$ is outputted as a voltage $V_{TH}$. Therefore, the threshold value $\Delta\theta$ is actually a voltage value, and the value in this embodiment is 0.5 V.

If it is judged that $\theta_{t1}-\theta_{ts}$ is larger than $\Delta\theta$ in Step S10, the ECU 6 judges that the throttle valve opening degree $\theta_{t1}$ is approaching the 3–2 shift line in FIG. 5, and the control processing proceeds to Step S11. In Step S11, the ECU 6 reads from the memory the throttle valve opening degree $\theta_{t1}$ at the time when the time period t1 has elapsed, which has been stored in the memory in Step S9, and the throttle valve opening degree $\theta$, which has been stored in the memory in Step S8 of the control cycle immediately before the time period t1 has elapsed, and calculates the change rate $(\theta_{t1})'$ of the throttle valve opening degree at the time when the time period t1 has elapsed by dividing the difference in the throttle valve opening degree, which is obtained by subtracting the value $\theta$ from the value $\theta_{t1}$, by the control interval. Next, the ECU 6 determines whether the calculated change rate $(\theta_{t1})'$, which represents the change tendency of engine load at the time when the time period t1 has elapsed, is larger than a threshold value $\Delta(\theta)'$ read from the memory. The threshold value $\Delta(\theta)'$ is a time differential value of voltage, and the value in this embodiment is set at 10 V/s.

If it is judged that $(\theta_{t1})'$ is larger than $\Delta(\theta)'$ in Step S11, the ECU 6 predicts that the throttle valve opening degree $\theta$ is increasing and has a high possibility of crossing the 3–2 shift line immediately after this judgment; therefore, there is a high possibility of downshifting request from the fourth speed to the second speed, and the control processing proceeds to Step S12.

The reason for determining the request for downshifting to the second speed in Steps S10 and S11 at the time when t is equal to 0 (at the time when the time period t1 has elapsed) after the 4–3 downshifting command is outputted is as follows.

As described above, when the speed change initiation time period t2 has elapsed from the time when the 4–3 downshifting command is outputted, the second brake 23, which is the disengagement-side element in the downshifting from the fourth speed to the third speed, has already begun to slip. Therefore, it is difficult to shift, at this point of time, to the downshifting operation from the fourth speed to the second speed, which must be performed while the second brake 23 is being engaged. On the other hand, before the speed change initiation time period t2 elapses, the second brake 23 has not yet begun to slip, so that the shift to the downshifting operation from the fourth speed to the second speed can be performed by quickly re-engaging the second brake 23. For this reason, the request for downshifting to the second speed is determined before the speed change initiation time period t2 elapses.

The reason for using the amount of change and the change rate of the throttle valve opening degree $\theta$ for determining the request for downshifting to the second speed is due to the fact that the further depression of the accelerator pedal by a driver can be predicted accurately by considering the inertia of his/her foot and that of the accelerator pedal.

In Step S12, the ECU 6 outputs a command for canceling the command for downshifting from the fourth speed to the third speed, which has already been outputted, and outputs a command for downshifting from the fourth speed to the second speed in the next Step S13.

As a result, under the control of the oil pressure controller 5 controlled by the ECU 6, hydraulic fluid is supplied at full line pressure to the second brake 23 and the oil pressure, which has so far been supplied to the first clutch 15, is discharged from the clutch 15 immediately after the disengagement operation of the second brake 23 and the engagement operation of the first clutch 15 are stopped. During this time, the second clutch 17 is kept in the engaging condition. As a result, the disengaging condition of the first clutch 15 and the engaging condition of the second brake 23 are temporarily established, that is, the fourth speed is temporarily established again. Subsequently, the disengagement control of the second clutch 17 and the engagement control of the first clutch 15 are quickly initiated.

Figure 3:
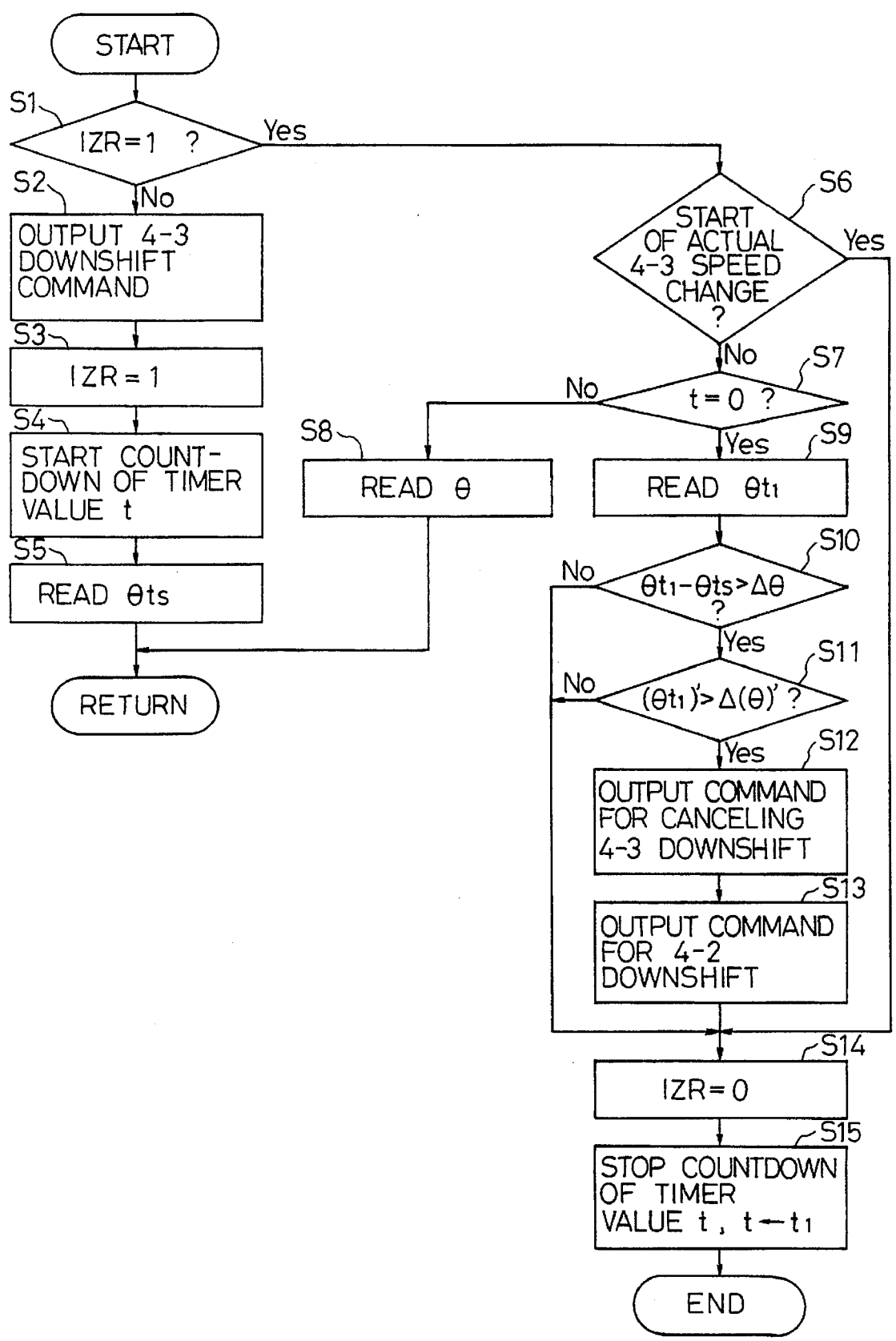
FIG. 3 is a flowchart showing a speed change control procedure executed by the electronic control unit shown in FIG. 1.

Next, the ECU 6 resets the value of the control program control variable $I_{ZR}$ to "0" in Step S 14, stops the countdown operation of the timer, and sets initial value t1 on the timer in the next Step S15, by which the control processing in FIG. 3 is completed.

On the other hand, if it is judged that $\theta_{t1}-\theta_{ts}$ is smaller than or equal to $\Delta\theta$ in Step S10 of the control cycle where it is determined whether the time period t1 has elapsed (t=0) before the actual 4–3 speed change is started, or if it is judged that $(\theta_{t1})'$ is smaller than or equal to $\Delta(\theta)'$ in Step S11 of that control cycle, the ECU 6 predicts that the change amount or the change rate of the throttle valve opening degree is small, so that the throttle valve opening degree $\theta$ has a low possibility of crossing the aforementioned 3–2 shift line; therefore, there is a low possibility of downshifting request from the fourth speed to the second speed. If the judgment result in Step S10 or Step S11 is No in this manner, the ECU 6 executes Step 14 directly without executing Steps S12 and S13. Thereupon, the control variable $I_{ZR}$ is reset to "0". Next, the ECU 6 stops the countdown operation of the timer, and sets initial value t1 on the timer, by which the control processing in FIG. 3 is completed. As a result, the downshift control from the fourth speed to the third speed is continued.

If it is judged that the speed change from the fourth speed to the third speed has actually started in Step S6 before the time period t1 elapses from the time point when the 4–3 downshifting command is outputted, the ECU 6, judging that it has become difficult to execute skip downshifting from the fourth speed to the second speed, executes Steps S14 and S15 to reset the control variable $I_{ZR}$ and the timer value t without executing Steps S7 through S13 relating the suitability judgment and execution of skip downshifting, by which the speed change control processing in FIG. 3 is completed.

Afterward, each time it is judged that the throttle valve opening degree $\theta$ has crossed the 4–3 shift line in the gear position judgment routine, the speed change control processing in FIG. 3 is started.

Because such control is carried out, when a driver depresses the accelerator pedal relatively slowly from the fourth speed zone to the second speed zone, skip downshifting from the fourth speed to the second speed is performed. In the skip downshifting in this embodiment, direct speed change from the fourth speed to the second speed is executed as indicated by the solid line in FIG. 5. For this reason, the incidence of shift shocks is reduced by half as compared with the conventional downshifting operation indicated by the broken line in FIG. 5, in which the third speed is established once, and the time required for the establishment of the third speed becomes unnecessary, so that the shift response is increased.

The aspect of the present invention is not limited to the above-described embodiment. For example, in this embodiment, a throttle sensor has been used as engine load detecting means. Instead, charging efficiency detecting means or the like may be used. Also, in this embodiment, the difference and the change rate of the throttle valve opening degree, that is, the engine load has been calculated at the time when the countdown of timer is completed, and if it is judged that both of these are larger than the respective threshold values, skip downshifting has been executed. However, skip downshifting may be executed by the judgment of either one of the two. Further, in this embodiment, the present invention has been applied to a downshifting from the fourth speed to the second speed. However, the present invention may be applied to other skip downshifting, for example, from the fifth speed to the third speed or from the third speed to the first speed.

We claim:

1. A speed change control method for an automatic transmission arranged to establish a plurality of speeds, comprising:

(a) starting a speed change operation from a first speed to a second speed when a command for a speed change from a first speed to a second speed, which is lower than said first speed, is output;

(b) determining an elapsed time from a time when said command for speed change from said first speed to said second speed was output;

(c) determining whether a request for speed change to a third speed, which is lower than said second speed, is present, if it is judged that a predetermined time period has elapsed from said time when said command for speed change from said first speed to said second speed was output; and (d) cancelling said speed change operation from said first speed to said second speed, re-establishing said first speed, and starting a speed change from said first speed to said third speed, if it is judged that said request for speed change to said third speed is present.

2. The speed change control method according to claim 1, wherein said speed change operation in said step (a) includes
disengaging a first friction-engaging element, said first friction-engaging element engages to establish said first speed and disengages to establish said second speed, and engaging a second friction-engaging element, said second friction engaging element disengages to establish said first speed and engages to establish said second speed.

3. The speed change control method according to claim 2, wherein said step (c) comprises setting said predetermined time period at a value shorter than a time period required for said first friction-engaging element to actually start disengaging in response to said command for speed change from said first speed to said second speed.

4. The speed change control method according to claim 3, wherein said step (c) comprises detecting a difference between an engine load at the time when said command for speed change from said first speed to said second speed is output and an engine load at the time when said predetermined time period elapses from the time when said command for speed change from said first speed to said second speed is output, and judging that the request for speed change to said third speed is present if said difference between said detected engine loads is larger than a predetermined value.

5. The speed change control method according to claim 3, wherein said step (c) comprises detecting an engine load change rate at the time when said predetermined time period has elapsed from the time when said command for speed change from said first speed to said second speed is output, and judging that said request for speed change to said third speed is present, if said detected engine load change rate is higher than a predetermined value.

6. The speed change control method according to claim 2, wherein said step (c) comprises detecting a difference between an engine load at the time when said command for speed change from said first speed to said second speed is output and an engine load at the time when said predetermined time period elapses from the time when said command for speed change from said first speed to said second speed is output, and judging that the request for speed change to said third speed is present if said difference between said detected engine loads is larger than a predetermined value.

7. The speed change control method according to claim 2, wherein said step (c) comprises detecting an engine load change rate at the time when said predetermined time period has elapsed from the time when said command for speed change from said first speed to said second speed is output, and judging that said request for speed change to said third speed is present, if said detected engine load change rate is higher than a predetermined value.

8. The speed change control method according to claim 2, wherein said step (c) comprises setting said predetermined time period at a value shorter than a time period required for a rotation speed of an input shaft of said automatic transmission to increase due to an disengaging operation of said first friction-engaging element in response to said command for speed change from said first speed to said second speed.

9. A speed change control method according to claim 1, wherein said step (c) comprises detecting a difference between an engine load at the time when said command for speed change from said first speed to said second speed is output and an engine load at the time when said predetermined time period elapses from the time when said command for speed change from said first speed to said second speed is output, and judging that the request for speed change to said third speed is present if said difference between said detected engine loads is larger than a predetermined value.

10. The speed change control method according to claim 1, wherein said step (c) comprises detecting an engine load change rate at the time when said predetermined time period has elapsed from the time when said command for speed change from said first speed to said second speed is output, and judging that said request for speed change to said third speed is present, if said detected engine load change rate is higher than a predetermined value.

* * * * *